US009408113B2

(12) United States Patent
Keller et al.

(10) Patent No.: US 9,408,113 B2
(45) Date of Patent: *Aug. 2, 2016

(54) METHODS OF AND NODES FOR SELECTING A TARGET CORE NETWORK FOR HANDING OVER A VOICE SESSION OF A TERMINAL (71) Applicant: Telefonaktiebolaget LM Ericsson (publ), Stockholm (SE)

(72) Inventors: Ralf Keller, Würselen (DE); Gunnar Rydnell, Göteborg (SE); Ann-Christine Sander, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/001,378

(22) Filed: Jan. 20, 2016

(65) Prior Publication Data

US 2016/0142945 A1    May 19, 2016

Related U.S. Application Data

(63) Continuation of application No. 14/240,843, filed as application No. PCT/EP2011/004356 on Aug. 30, 2011, now Pat. No. 9,277,461.

(51) Int. Cl.
*H04W 36/00* (2009.01)
*H04W 36/14* (2009.01)
(52) U.S. Cl.
CPC ...... *H04W 36/0022* (2013.01); *H04W 36/0061* (2013.01); *H04W 36/0066* (2013.01); *H04W 36/14* (2013.01)

(58) Field of Classification Search
None
See application file for complete search history.

(56) References Cited

U.S. PATENT DOCUMENTS

| 2011/0013597 A1 | 1/2011 | Hwang et al. |
| 2011/0171926 A1 | 7/2011 | Faccin et al. |
| 2011/0171953 A1 | 7/2011 | Faccin et al. |
| 2013/0150039 A1* | 6/2013 | Ramle ............... H04W 36/0061 455/436 |

FOREIGN PATENT DOCUMENTS

| EP | 1 422 914 A1 | 5/2004 |
| EP | 1 845 687 A1 | 10/2007 |

OTHER PUBLICATIONS

ETSI TS 136 413 V9.7.0 LTE; Evolved Universal Terrestrial Radio Access Network (EUTRAN); S1 Application Protocol (S1AP) (3GPP TS 36.413 version 9.7.0 Release 9), Jun. 2011, pp. 38-39.*
Decision on Grant, corresponding to Russian Application No. 2014112030, mailed Mar. 9, 2016, (English translation 8 pages, Russian 11 pages).

* cited by examiner

*Primary Examiner* — Ashley Shivers
(74) *Attorney, Agent, or Firm* — Myers Bigel & Sibley, P.A.

(57) ABSTRACT

A method of selecting a target core network of a communication network for handing over a voice session of a terminal from a packet switched source radio access network (RAN) to a target RAN. The voice session is anchored in an Internet Protocol Multimedia Subsystem, and the selected target core network includes a circuit switched domain which is associated with the target RAN and supports voice session continuity to hand over the voice session from the source RAN to the target RAN. The target RAN is associated with a network identification of the target core network. The method is executed by a node and includes receiving a network identification of at least one target core network associated with at least one target RAN. The target core network is selected based on an indicated support of voice session continuity by the network identification.

11 Claims, 6 Drawing Sheets

METHODS OF AND NODES FOR SELECTING A TARGET CORE NETWORK FOR HANDING OVER A VOICE SESSION OF A TERMINAL

CROSS REFERENCE TO RELATED APPLICATION

This U.S. non-provisional patent application is a continuation of U.S. patent application Ser. No. 14/240,843, filed on Feb. 25, 2014, which claims priority under 35 USC §119 to PCT International Application No. PCT/EP2011/004356, filed on Aug. 30, 2011, the entire contents of each of which are hereby incorporated by reference herein.

TECHNICAL FIELD

The invention relates to telecommunications, and in particular to methods of, a node and a control node for selecting a target core network of a communication network for handing over a voice session of a terminal from a packet switched source radio access network of the communication network to a target radio access network of the communication network, and a computer program.

BACKGROUND

In a commonly known communication network configuration, a terminal is located in a packet switched source radio access network, and has established a voice session to a terminating side. The voice session is anchored in an Internet Protocol Multimedia Subsystem (IMS) of the communication network. When the terminal may lose contact to the source radio access network, a handover of the terminal to a target radio access network may allow for continuing the established voice session to the terminating side. In such a case, Single Radio Voice Call Continuity (SRVCC) allows for the handover of the terminal from the packet switched radio access network to a target radio access network associated with a circuit switched domain of a target core network. For example, the terminal may be handed over from a Long Term Evolution (LTE) or UMTS Terrestrial Radio Access Network (UTRAN) High Speed Packet Access (HPAS) radio access network to a UTRAN or a GSM EDGE Radio Access Network (GERAN) target radio access network.

However, presently there is no procedure defined which guarantees that a SRVCC employing handover of a terminal from a packet switched source radio access network to a target radio access network associated with a circuit switched domain of a target core network is successfully executed.

SUMMARY

It is an object of the present invention to provide methods and nodes for allowing a handover of a voice session anchored in an Internet Protocol Multimedia Subsystem based communication network from a packet switched source radio access network to a target radio access network associated with a circuit switched network domain of a target core network which employs voice session continuity. Further, it is an object of the present invention to provide a computer program using such a method.

The object defined above is solved by methods of, a node and a control node for selecting a target core network of a communication network for handing over a voice session of a terminal from a packet switched source radio access network of the communication network to a target radio access network of the communication network, and a computer program according to the independent claims. Further embodiments of the methods, the node, and the control node are defined in the dependent claims.

According to an exemplary aspect of the invention, a method of selecting a target core network of a communication network for handing over a voice session of a terminal from a packet switched source radio access network of the communication network to a target radio access network of the communication network is provided. The voice session is anchored in an Internet Protocol Multimedia Subsystem of the communication network, and the selected target core network comprises a circuit switched domain which is associated with the target radio access network and supports voice session continuity allowing to hand over the voice session from the packet switched source radio access network to the target radio access network. The target radio access network is associated with a network identification of the target core network. The method is executed by a node of the source radio access network.

The method comprises receiving a network identification of at least one target core network associated with at least one target radio access network. The network identification indicates support for voice session continuity. The method comprises selecting the target core network based on the indicated support of voice session continuity indicated by the received network identification.

According to another exemplary aspect of the invention, a method of selecting a target core network of a communication network for handing over a voice session of a terminal from a packet switched source radio access network of the communication network to a target radio access network of the communication network is provided. The voice session is anchored in an Internet Protocol Multimedia Subsystem of the communication network, and the selected target core network comprises a circuit switched domain which is associated with the target radio access network and supports voice session continuity allowing to hand over the voice session from the packet switched source radio access network to the target radio access network. The target radio access network is associated with a network identification of the target core network. The method is executed by a control node of the communication network associated with the source radio access network. The method comprises sending a network identification of at least one target core network associated with at least one target radio access network, wherein the network identification indicates support for voice session continuity, for selecting the target core network based on the indicated support of voice session continuity indicated by the sent network identification.

According to another exemplary aspect of the invention, a node for selecting a target core network of a communication network for handing over a voice session of a terminal from a packet switched source radio access network of the communication network to a target radio access network of the communication network is provided. The voice session is anchored in an Internet Protocol Multimedia Subsystem of the communication network, and the selected target core network comprises a circuit switched domain which is associated with the target radio access network and supports voice session continuity allowing to hand over the voice session from the packet switched source radio access network to the target radio access network. The target radio access network is associated with a network identification of the target core network. The node is part of the source radio access network. The node comprises a reception unit configured to receive a network identification of at least one target core network associated with at least one target radio access network. The network identification indicates support for voice session continuity. The node comprises a selection unit configured to select the target core network based on the indicated support of voice session continuity indicated by the received network identification.

According to another exemplary aspect of the invention, a control node for selecting a target core network of a communication network for handing over a voice session of a terminal from a packet switched source radio access network of the communication network to a target radio access network of the communication network is provided. The voice session is anchored in an Internet Protocol Multimedia Subsystem of the communication network, and the selected target core network comprises a circuit switched domain which is associated with the target radio access network and supports voice session continuity allowing to hand over the voice session from the packet switched source radio access network to the target radio access network. The target radio access network is associated with a network identification of the target core network. The control node is part of the communication network, and is associated with the source radio access network. The control node comprises a sending unit configured to send a network identification of at least one target core network associated with at least one target radio access network, wherein the network identification indicates support for voice session continuity, for selecting the target core network based on the indicated support of voice session continuity indicated by the sent network identification.

According to another exemplary aspect of the invention, a computer program is provided. The computer program, when being executed by a processor, is configured to carry out or control a method of selecting a target core network of a communication network for handing over a voice session of a terminal from a packet switched source radio access network of the communication network to a target radio access network of the communication network as described above.

BRIEF DESCRIPTION OF THE DRAWINGS

Embodiments of the invention will be described in more detail hereinafter with reference to examples, but to which the scope of the invention is not limited.

DETAILED DESCRIPTION

The illustration in the drawing is schematic. In different drawings, similar or identical elements are provided with the same reference signs or with reference signs which are different from one another in the first digit.

In the following, the methods, the node, the control node, and the computer program according to the exemplary aspects of the invention will be explained in more detail.

Within the context of the present application, the term "voice session continuity" may particularly denote a functionality allowing for session continuity of an IMS based voice session originated in a packet switched source radio access network to be handed over to a target radio access network associated with a circuit switched domain of a target core network. In particular, the term "voice session continuity" may refer to SRVCC which may be particularly defined in accordance with 3rd Generation Partnership Project (3GPP) Technical Specification (TS) 23.216 v11.1.0.

According to the exemplary aspects, a fast and reliable handover of a voice session of a terminal from the packet switched radio access network to a target radio access network associated with a circuit switched domain of the target core network may be enabled by informing a node of the source radio access network of network identification of one or more possible target core networks supporting voice session continuity. Further, based on a selection executed by the node of the source radio access network, the control node of the communication system associated with the source radio access network may be informed of the network identification of the selected target core network. Here, the step of the selecting may comprise selecting the network identification associated with the at least one target core network.

Thus, the communication network may be enhanced or upgraded by allowing for voice session continuity during a handover of the voice session of the terminal from the packet switched source radio access network to the target radio access network. Here, the communication network may also support circuit switched fallback of the terminal from the packet switched source radio access network to a target radio access network associated with the circuit switched domain of the target core network without an established voice session of the terminal. Further, the selection of the target core network may be, in particular in comparison to a pre-configuration of the node of the source radio access network with respective information about the possible target core access networks supporting voice session continuity, executed dynamically and dedicated for each terminal for handing over the voice session of the terminal. Therefore changes of a network architecture of the communication network may be accounted for.

Next, further exemplary embodiments of the method executed by the node of the source radio access network will be explained. However, these embodiments also apply to the method executed by the control node, the node, the control node, and the computer program.

The target radio access network may be associated with a plurality of target core networks of the communication network, and the step of selecting may comprise selecting the target core network from the plurality of target core networks. Each of the plurality of target core networks may be associated with a respective network identification, and the node may receive the network identifications of the plurality of target core networks and the network identification of the at least one target core network together in one message. Thus, voice session continuity may be supported for the communication network comprising a shared networks configuration which may be particularly defined in accordance with 3GPP TS 23.251 v10.2.0. In particular, in a shared networks configuration, one target radio access network may be associated with two different target core networks.

For example, such a shared networks configuration may comprise a Multi Operator Core Network (MOCN) configuration in which two different network operators may be associated with two different target core networks but with a shared target radio access network. A cell of the shared target radio access network may be associated with both target core networks and thus both operators or may be associated with one of the two different target core networks and thus with one operator of the two different operators. Each target core network of the two different target core networks may be associated with another target radio access network which may be also shared or not shared by the two different network operators. Another shared networks configuration may comprise a Gateway Core Network (GWCN) configuration in which portions of two different target core networks and a target radio access network may be shared between different network operators. In the MOCN configuration, each target core network may be associated with a different network identification, whereas in the case of the GWCN configuration, a target core network may be associated with multiple different network identifications, each of which network identification may be associated with a different network operator.

In particular, the method may further comprise determining whether the network identification of the at least one target core network may be a preferred network identification, wherein the step of the selecting may comprise selecting the target core network based on a result of the latter mentioned determination, and in particular, if the latter mentioned determination may be in the affirmative. The preferred network identification may be associated with the network operator of the source radio access network, and thus the handover to the target core network of the preferred network identification may be favorable. To this end, the node may be preconfigured to be aware which network identifications may be preferred, for example, by comprising a list of one or more preferred network identifications. Thus, signaling during the handover and also charging of the handed over voice session may be facilitated in the case in which the network operator of the source radio access network and the target core network may coincide. In a case in which the latter mentioned determination may not be in the affirmative for any of the received network identifications indicating support for voice session continuity, i.e. for the network identification of the at least one target core network and optionally further network identifications indicating voice session continuity, the step of the selecting may be still executed by selecting a core network supporting voice session continuity and being associated with anyone of the received network identifications indicating support for voice session continuity.

In a first option of receiving the network identification of the at least one core network, the network identification of the at least one target core network may be received in a list exclusively comprising network identifications of target core networks indicating support for voice session continuity and optionally for handing over the voice session to a packet switched domain of a target core network. In the following, the latter mentioned handover of the terminal may be referred to as a "packet switched handover". In particular, a part or all network identifications of the list may exclusively indicate support for session voice continuity. Accordingly, the step of the selecting may comprise selecting any network identification from the list, since all network identifications may indicate support for voice session continuity. To this end, the control node associated with the source radio access network may select the network identification of the possible target core networks supporting voice session continuity, and may generate the list based on the selection. Further, the node of the source radio access network may be preconfigured to be aware that the list to be received exclusively comprises network identifications of the possible target core networks supporting voice session continuity. Thus, signaling load may be low for the transmission of the network identification, since only few network identifications may be transmitted from the control node to the node of the source radio access network.

In a second option of receiving the network identification of the at least one core network, the method may further comprise receiving another list which comprises network identifications of target core networks indicating support for a handover of the voice session to a packet switched domain of a target core network. The list and the another list may be received together in one message or may received separately in two messages. All network identifications of the another list may not indicate support for session voice continuity. Thus, the step of the selecting may comprise selecting a network identification from the list exclusively comprising the network identifications of the target core networks indicating support for voice session continuity. Here, the node may be preconfigured to be aware of a reception of two different lists and of which list may comprise the network identification of at least one target core network.

In a third option of receiving the network identification of the at least one core network, the network identification of the at least one target core network may be received in a list comprising network identifications of target core networks, wherein an individual indication for the support of voice session continuity may be associated with the network identification of the at least one target core network. For example, the indication may be configured as a tag associated with the network identification of the at least one target core network or with more network identifications of those target core networks also indicating support for voice session continuity. In particular, the target core networks identified by the network identifications in the list may support a packet switched handover and/or voice session continuity. Here, the node may be preconfigured to be able to interpret the indication associated with the received network identification or the received network identifications.

In particular, the network identification of the at least one target core network may be received in a "modified" Handover Restriction List, wherein the Handover Restriction List may be particularly defined in accordance with 3GPP TS 23.401 v10.4.0 In particular, the modified Handover Restriction List may comprise or may be identical with the list received in the above described first option or the list received in the above described third option. In case of the above described second option, the modified Handover Restriction List may comprise a first section and a second section, and the first section may comprise the list exclusively comprising the network identifications of the target core networks indicating support for a packet switched handover and the second section may comprise the list exclusively comprising the network identifications of the target core networks indicating support for voice session continuity.

The method may further comprise receiving connectivity quality information from the terminal for the at least one target radio access network associated with the at least one target core network, wherein the step of selecting may comprise selecting the target core network based on the received connectivity quality information. To this end, the node may request connectivity quality information from the terminal for a connection of the terminal to the at least one target radio access network associated with the at least one target core network associated with the received network identification. In particular, the connectivity quality information may comprise or may be configured as one or more measurement reports generated by the terminal. Thus, the step of the selecting may be further improved in that the signal strength of a connection of the terminal to possible target radio access networks may be considered for the selection. Further, the node of the source radio access network may select the target radio access network showing an high signal strength of a connection of the terminal to this particular target radio access network associated with the at least one target core network.

In particular, the method may further comprise generating a radio access list, particularly a Neighbor Cell List (NCL), based on the received network identification of the at least one target core network. In particular, the radio access list may comprise one or more cells of the at least one target radio access network associated with the at least one core network indicated by the received network identification and optionally one or more cells of target radio access networks associated with further target core network indicated by further received network identifications indicating support for voice session continuity. The radio access list comprises cells in the coverage area of which the terminal is potentially located. In particular, the radio access list may be generated prior to or subsequent to the receiving and/or requesting of the connectivity quality information. The selection of the core network may be executed by selecting the cell and thus the target core network associated with the network identification of the at least one core network. To this end, the network identification associated with the cell may be selected. Thus, the step of the selecting may be facilitated and fastened in that cells of suitable target radio access networks may be collected for the selection.

The step of the selecting may comprise selecting the target core network based on a policy associated with the at least one target core network. To this end, the method may further comprise determining whether the handover to be executed is in accordance with the policy, and the step of the selecting may comprise selecting the target core network based on a result of the latter mentioned determination, and in particular, if the latter mentioned determination may be in the affirmative. In particular, such a policy may comprise whether the terminal is allowed to be handed over to the target radio access network associated with the at least one target core network, for example for a particular time of the day or based on a particular contract between a subscriber and the network operator associated with the target radio access network and/or the target core network. Accordingly, the method may be executed in accordance with already existing policies, thereby facilitating the enhancement of an already existing communication network for support of voice session continuity.

In particular, the above described steps may be executed during a connected state of the terminal in which an establishment of a voice session of the terminal with a terminating side may be executed and/or in which the voice session of the terminal to a terminating side may be established. In both of the latter cases, the terminal may have originated the voice session or be may a called party.

The method may further comprise requesting voice session continuity when handing over the session of the terminal from the packet switched source radio access network to the target radio access network, and sending a network identification of the selected target core network to a control node of the communication network associated with the packet switched source radio access network. In particular, the request for voice session continuity and/or the network identification may be sent in one message, for example in a handover request message, or in separate messages. Thus, the control node associated with the source radio access network may be enabled to select the target core network for executing the handover.

The network identification may comprise at least one Public Land Mobile Network (PLMN) identifier which may be particularly defined in accordance with 3GPP TS 23.003 v9.0.0. In particular, the network identification may comprise a so called Selected PLMN identifier and/or an equivalent PLMN identifier both being associated with the target core network. The term "equivalent PLMN identifier" may refer to a network identification of a core network distinct from the core network of a Selected PLMN identifier which may also be accessible by the terminal for receiving a service similar to a service provided by the core network of the Selected PLMN identifier in case in which the terminal may lose contact with the target core network of the Selected PLMN identifier.

In particular, the source radio access network and/or the target radio access network may be associated with a home communication network of the terminal or with a serving communication network of the terminal distinct from the home communication network. The network identification of the home communication network and the serving communication may be identical to one another.

Next, further exemplary embodiments of the method executed by the control node associated with the source radio access network will be explained. However, these embodiments also apply to the method executed by the node of the source radio access network, the node, the control node, and the computer program.

In particular, the control node may be located in and may be part of a packet switched network domain of a source core network, and the packet switched domain may be associated with the source radio access network. In particular, the source core network may exclusively comprise the packet switched domain or may comprise the packet switched domain and a circuit switched domain. In particular, the source core network and the target core network may be identical to one another or may be different from one another.

The method may further comprise determining whether voice session continuity may be supported for a subscriber of the terminal. In particular, in a case of the shared networks configuration of the communication network, the determining may comprise determining whether voice session continuity may be supported for a subscriber of the terminal for the shared networks configuration of the communication network. Further, the method may comprise sending a support indication indicating the support for voice session continuity for the subscriber of the terminal to the node of the source radio access network based on a result of the latter mentioned determination, and in particular, if the latter mentioned determination may be in the affirmative. The support indication may be sent together with the network identification of the at least one target core network in one message or in separate messages.

In particular, the step of determining whether voice session continuity may be supported for a subscriber associated with the terminal comprise determining whether a subscriber server, particularly a Home Subscriber Server, may comprise an indication in a subscriber record of the subscriber server associated with the subscriber that voice session continuity may be supported. To this end, the control node may request and receive information related to the indication of the subscriber server from the subscriber server.

In particular, the terminal may also support voice session continuity such that voice session continuity may be executable for the subscriber.

The method may further comprise receiving a network identification of the selected target core network, and selecting a control node of the circuit switched domain of the selected target core network based on the received network identification for executing the handover. The network identification may be sent in a handover request message.

The method may further comprise sending the received network identification of the selected target core network to the selected control node. To this end, the control node may determine whether the control node of the target core network may be associated with at least another network identification. For example, in a GWCN shared networks configuration of the communication network, the control node of the target core network may be part of another core network. The sending of the received network identification may be executed based on a result of the latter mentioned determination, and in particular if the latter mentioned determination may be in the affirmative. The network identification may be sent in a handover required message. Thus, the control node of the target core network may be enabled to select the correct target radio access network associated with the selected target core network.

Next, further exemplary embodiments of the node will be explained. However, these embodiments also apply to the methods, the control node, and the computer program.

In particular, a unit of the node may be configured to execute one or more steps of a method of selecting a target core network of a communication network for handing over a voice session of a terminal from a packet switched source radio access network of the communication network to a target radio access network of the communication network as described above.

The node may be configured as an eNodeB of a packet switched LTE access network or a NodeB of an UTRAN HSPA radio access network.

Next, further exemplary embodiments of the control node will be explained. However, these embodiments also apply to the methods, the node, and the computer program.

In particular, a unit of the control node may be configured to execute one or more steps of a method of selecting a target core network of a communication network for handing over a voice session of a terminal from a packet switched source radio access network of the communication network to a target radio access network of the communication network as described above.

The control node may be configured as a Mobility Management Entity of particularly a packet switched domain of a source core network of the communication network.

In particular, respective unit of a control node of the selected target core network may be configured to execute one or more steps of a method of selecting a target core network of a communication network for handing over a voice session of a terminal from a packet switched source radio access network of the communication network to a target radio access network of the communication network as described above.

In particular, the control node of the selected target core network may be configured as a Mobile Switching Center Server (MSC-S).

Figure 1:
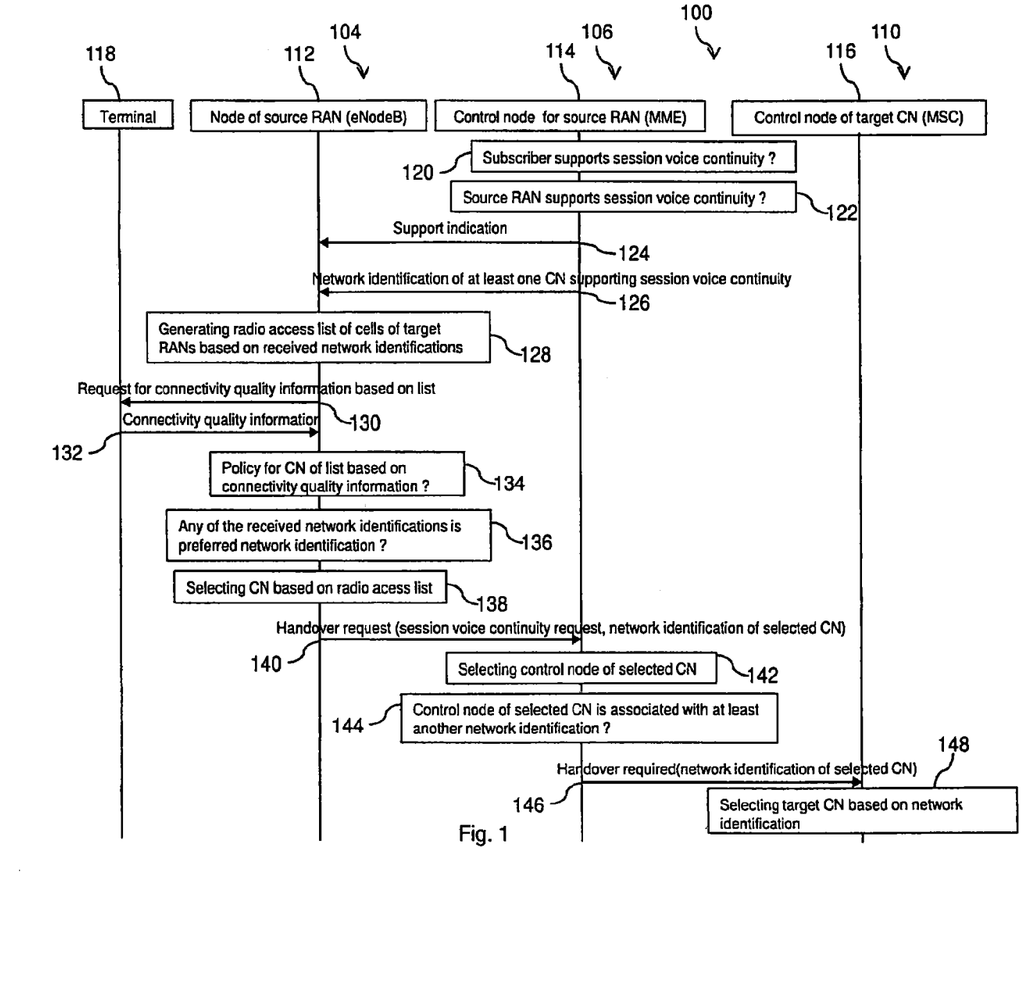
FIG. 1 is a flow diagram illustrating a method of selecting a target core network of a communication network for handing over a voice session of a terminal from a packet switched source radio access network of the communication network to a target radio access network of the communication network according to a first exemplary embodiment of the invention.

Referring to FIG. 1, a method of selecting a target core network of a communication network for handing over a voice session of the terminal from a packet switched source radio access network of the communication network to a target radio access network of the communication network according to a first exemplary embodiment of the invention will be explained. The communication network 100 associated with the method comprises an IMS domain of a communication network 100, a packet switched source radio access network 104, for example a LTE radio access network, a packet switched network domain of a source core network 106 associated with the source radio access network 104, a target radio access network, for example a GERAN radio access network, and a target core network 110 which comprises a circuit switched domain associated with the target radio access network. A node 112, for example an eNodeB, is part of the source radio access network 104, and a control node 114, for example a MME, of the packet switched domain of the source core network 106 is associated with the source radio access network 104. A control node 116, for example a MSC-S, is part of the target core network 110. A terminal 118 is located in the coverage area of the source radio access network 104, and has a voice session with a terminating side. The voice session is anchored in the IMS domain of the communication network 100. The terminal 118, the source radio access network 104, the source core network 106, the target radio access network, and the target core network 110 support voice session continuity during a session transfer of the voice session when handing over the terminal 118 from the source radio access network 104 to the target radio access network.

Further, the communication network 100 may comprise a MOCN network configuration, and the target radio access network may be associated with the target core network 110 and at least another different core network. The target core network 110 may be associated with a network operator A, and the at least another core network may be associated with another different network operator B. A cell of the target radio access network to which the terminal 118 is to be handed over may be associated with both the target core network 110 and the another core network, and thus with the network operator A and the another network operator B. Alternatively, the cell of the target radio access network to which the terminal 118 is to be handed over may be associated with one of the target core network 110 and the another target core network, and thus with one of the network operator A and the another network operator B. The target core network 110 and the another target core network have different network identifications a and b, respectively. The network identification a belongs to the operator A, and the network identification b belongs to the operator B. Thus, the target radio access network is associated with the network identifications a and b of the target core network 110 and the another target core network. The network identification a of the target core network 110 indicate support for voice session continuity. The network identification b of the another core network indicates support for a packet switched handover of the voice session of the terminal 118 to a packet switched domain of the target core network 110.

In a first step 120 of the method, the control node 114 determines whether voice session continuity allowing to hand over the voice session of the terminal 118 from the packet switched source radio access network 104 to the target radio access network is supported for a subscriber associated with the terminal 118 for the particular MOCN network configuration.

Here, voice session continuity is supported for the subscriber associated with the terminal 118, and the determination of the step 120 is thus in the affirmative. Next, in a step 122, the control node 114 determines whether voice session continuity is supported for the source radio access network 104 for the MOCN network configuration. As the source radio access network 104 supports voice session continuity, the determination of the step 122 is also the affirmative. Next, in a step 124, the control node 114 sends a support indication to the node 112 of the source radio access network 104 indicating that voice session continuity is supported for the subscriber associated with the terminal 118 based on a result of the determination in the step 120. Next, the control node 114 selects all network identifications a of possible target core networks 110 supporting voice session continuity.

In a step 126, the control node 114 sends the network identifications a of the possible target core network 110 including the network identification a of the target core network 110 to the node 112. The network identifications a may be comprised in a list exclusively comprising network identifications a of possible target core networks 110, i.e. an entry of the network identifications a in the list indicate support for voice session continuity. Next, in a step 128, the node 112 of the source radio access network 104 generates a radio access list comprising cells of the target radio access networks associated with the target core networks of the network identifications received in the step 126 and being in the coverage area of the terminal 118. Each cell of the radio access list is referenced by the respective network identification of the target core network 106 associated with the target radio access network to which the cell belongs. Here, the neighboring cells of the radio access networks associated with the target core networks 110 of the network identifications a received in the list of the step 126 are included in the generated radio access list. Next, in a step 130, the node 112 requests from the terminal 118 connectivity quality information of a connection of the terminal 118 to the respective target radio access networks 110 associated with the possible target core networks indicated in the generated radio access list. Next, in a step 132, the terminal 118 sends the requested connectivity quality information to the node 112 after having executed respective connectivity quality measurements. Here, the target radio access network associated with the target core network 110 and the at least another target core network is identified to have a high signal strength. In a step 134, the node 112 of the source radio access network 104 determines whether a handover of the terminal 118 is in accordance with a policy for those target core networks 110 associated with the cells comprised in the radio access list and whose associated radio access networks show the highest connectivity quality of a connection to the terminal 118. In this step, the target core network 110 is identified. Next, in a step 136, the node 112 determines whether any of the network identifications a received in the step 126 is a preferred network identification, i.e. is associated with the network operator of the source radio access network 104. Here, the network identification a of the target core network 110 is again identified. Next, in a step 138, based on the received connectivity quality information 132, the result of the determination in the step 134, and the result of the determination in the step 136, the target core network 110 is selected by selecting the target radio access network from the radio access list generated in the step 138 in terms of selecting the network identification a associated with a particular cell and thus the target core network 110.

Next, in a step 140, the node 112 sends a handover request to the control node 114 requesting a handover of the voice session of the terminal 118 from the source radio access network 104 to the target radio access network associated with the target core network 110. The handover request comprises a request for an execution of voice session continuity during the session transfer of the voice session, and the network identification a of the selected target core network 110. In a step 142, the control node 114 selects the control node 116 of the target core network 110 based on the received network identification a. In a step 144, the control node 114 determines whether the selected target core network 110 is associated with at least another network identification. As the shared network configuration of the communication network 110 is of MOCN type, the target core network 110 is not associated with another network identification, and the determination of the step 144 is not in the affirmative. Accordingly, in a handover required request sent in a step 146 from the control node 114 to the control node 116, no network identification a of the selected target core network 110 is included. In a step 148, the control node 116 selects the target core network 110 based on the received handover required message.

Alternatively, in the step 126, the network identification a of the target core network 110 may be received in a list exclusively comprising network identifications a of target core networks 110 indicating support for voice session continuity. Further, another list may be transferred together with the list in one message, and may exclusively comprise network identifications b of target core networks indicating support for a packet switched handover of the voice session of the terminal 118. The steps 130 to 136 may be executed for all network identifications a, b received in the list and the another list. Alternatively, the radio access list generated in the step 128 may only comprise cells of those target radio access networks indicated by the network identifications a of the target core networks 110 indicating support for voice session continuity.

Further, the network identification a of the target core network 110 may be received in the step 126 in a list comprising network identifications a, b of all possible target core networks supporting a packet switched handover and/or voice session continuity. An individual indication for support of voice session continuity may be received in the step 126 together with the network identifications in one message, and the indication may be associated with the network identification a of the target core network 110 and those network identifications of target core networks indicating support for voice session continuity. The radio access list generated in the step 128 exclusively comprises cells of the target radio access networks associated with the network identifications a of target core networks 110 indicating support for voice session continuity. Accordingly, the steps 130-136 may be executed for the target core networks 110 indicating support for voice session continuity.

Further, the step 144 may also be omitted.

Further, a GWCN network configuration of the communication network 100 is assumed in the following. In this network configuration, the control node 116 may be shared between the target core network 110 and the another target core network. The target radio access network is associated with the target core network 110 and the another target core network. The target core network 100 belongs to the operator A and comprises the network identifier a, and another target core network belongs to the operator B and comprises the network identifier b. The method described with respect to the MOCN configuration of the communication network 100 is identically executed. However, the determination of the step 144 is in the affirmative, and the network identification a of the selected target core network 110 is sent in the step 146 in the handover required message to the control node 116. A step 148 is executed subsequent to the step 146 in which the target core network 110 is selected by the control node 116 based on the network identification a received in the step 146, in order to successfully execute the handover.

Figure 2:
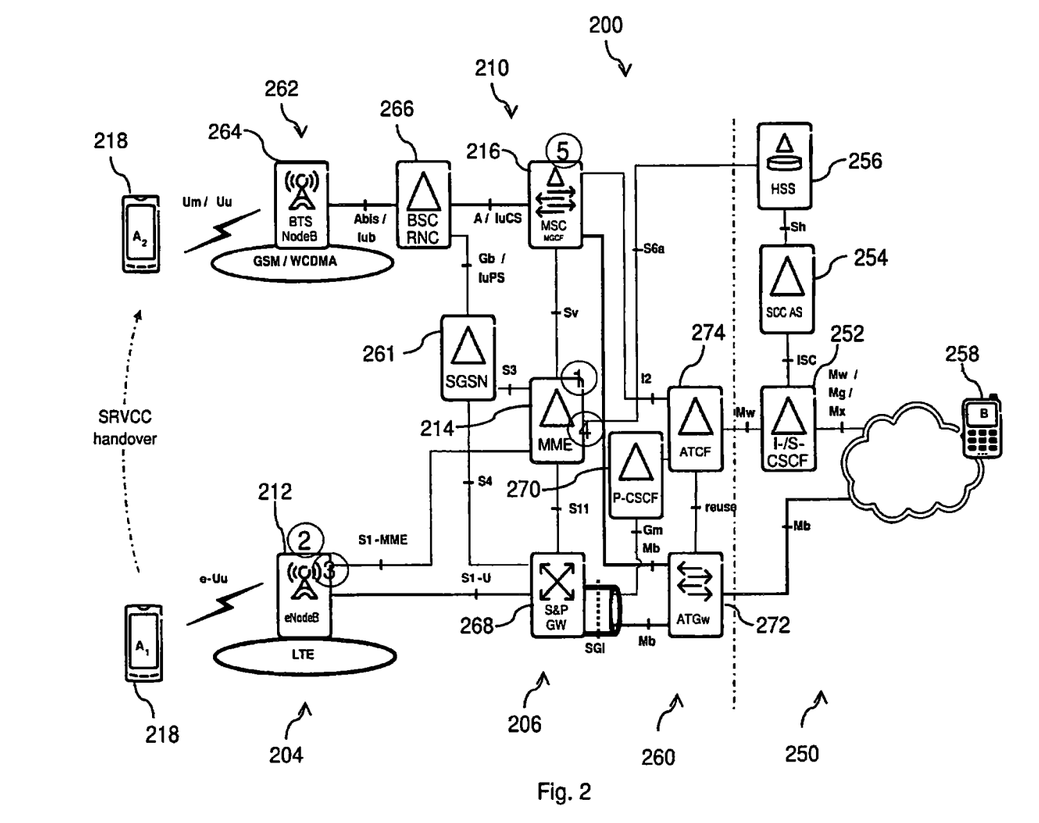
FIG. 2 is a block diagram illustrating a communication network associated with a method of selecting a target core network of the communication network for handing over a voice session of a terminal from a packet switched source radio access network of the communication network to a target radio access network of the communication network according to a second exemplary embodiment of the invention.
Figure 3:
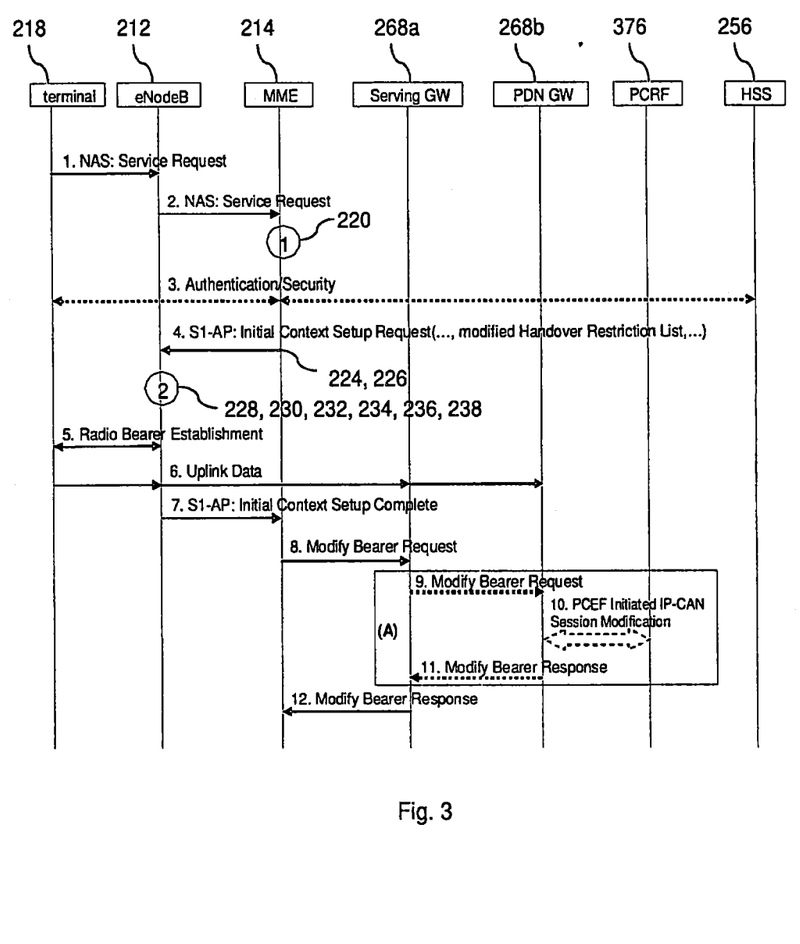
FIG. 3 is a flow diagram illustrating the method according to the second exemplary embodiment of the invention associated with the communication network in FIG. 2.
Figure 4:
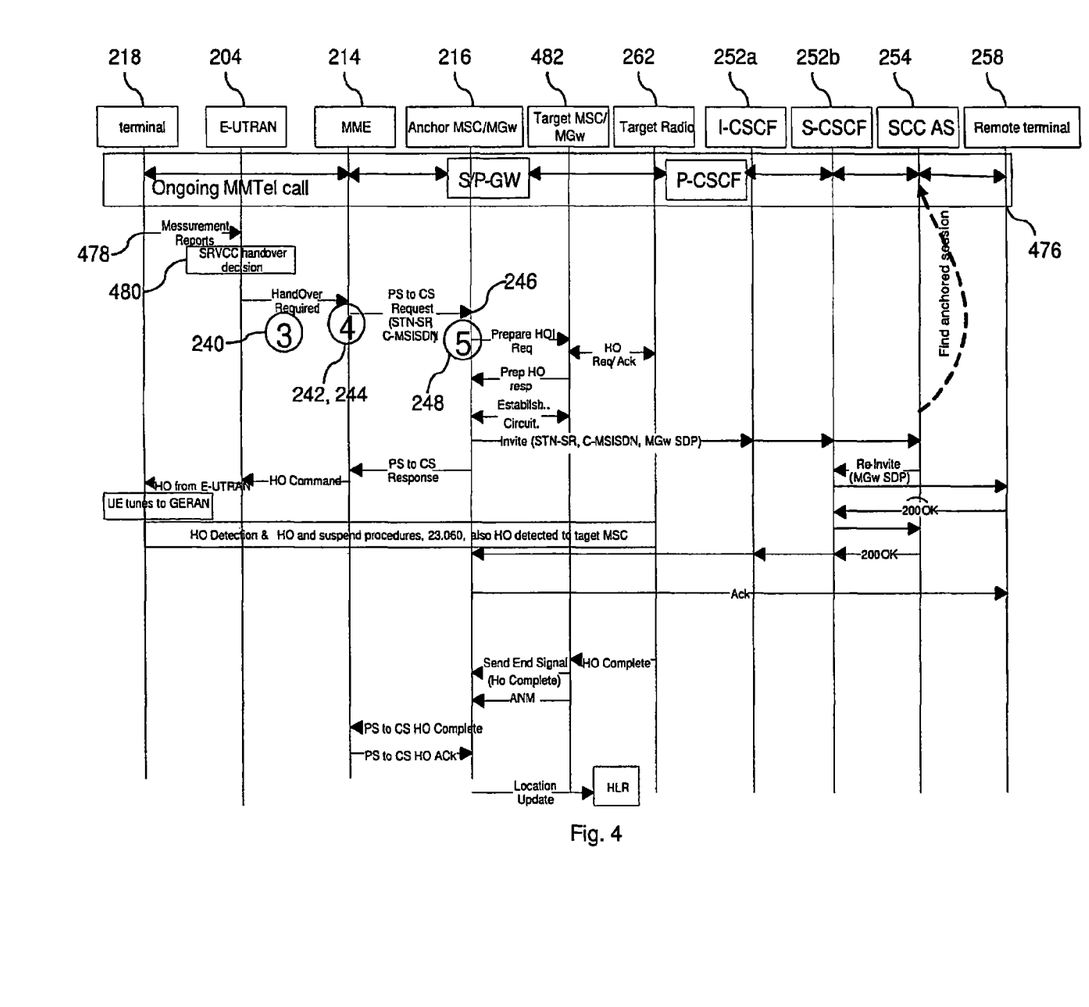
FIG. 4 is another flow diagram illustrating the method according to the second exemplary embodiment of the invention associated with the communication network in FIG. 2.

Referring to FIGS. 2 to 4, a communication network 200 associated with a method of selecting a target core network of a communication network for handing over a voice session of a terminal from a packet switched radio access network of the communication network to a target radio access network of the communication network according to a second exemplary embodiment of the invention is described. The communication network 200 comprises an IMS based home communication network 250 configured as a Home Public Land Mobile Network HPLMN in which a Serving-Call Session Control Function (S-CSCF) and an Interrogation-Call Session Control Function (I-CSCF) both being denoted by a common reference numeral 252, a Service Centralization and Continuity Application Server SCC AS 254, and a Home Subscriber Server HSS 256 are located. A terminal 258 is also located in HPLMN 250.

A serving communication network 260 of the communication network 200 is configured as a Visited Public Land Mobile Network VPLMN. A terminal 218 is located in the VPLMN 260, and is attached to a control node 214 configured as a MME via a node 212 of a LTE radio access network 204 which is configured as an eNodeB. The MME 214 forms part of a packet switched source core network 206 associated with the LTE radio access network 204. A target core network 210 comprises a control node 216, a MSC-S, which is part of a circuit switched domain of the target core network 210 and a Serving Gateway General Packet Radio Service (GPRS) Support Node SGSN 261 associated with a packet switched domain of the target core network 210. A GSM (GERAN/UTRAN) based target radio access network 262 associated with the circuit switched domain of the target core network 210 comprises a node 264, namely either a Base Transceiver Station (BTS) in the case of the GERAN radio access network or a NodeB in the case of the UTRAN radio access network, and a node 266, namely either a Base Station Controller (BSC) in the case of the GERAN radio access network or a Radio Network Controller (RNC) in the case of the UTRAN radio access network. A Serving Gateway S-GW and a PDN Gateway denoted by a common reference numeral 268, a Proxy-Call Session Control Function 270, an Access Transfer Gateway 272, and an Access Transfer Control Function ATCF 274 of the serving communication network 260 provides interconnectivity between the MME 214 and the source radio access network 204 and the home communication network 250. A Policy and Charging Rule Function PCRF 376 is also part of the home communication network 250 (FIG. 3). For explanation purposes, the S-GW and the P-GW are illustrated in FIG. 3 as separate nodes, and are denoted by reference numerals 268a, b, respectively. In FIG. 4, the I-CSCF and the S-SCSCF are illustrated as separate nodes, and are denoted by reference numerals 252a, b, respectively.

The communication network 200 may be in a GWCN network configuration, and the target radio access network 262 is shared by the core network 210 associated with the operator A and another core network associated with another operator B. The MSC-S 216 of the core network 210 is shared by the operator A and the another operator B. A network identification of the target core network 210 is configured as a Selected PLMN identifier, and is denoted by a. The target core network 210 supports SRVCC and a packet switched handover, and an entry of the Selected PLMN identifier a indicates support for SRVCC and also the packet switched handover. The another core network is associated by a Selected PLMN identifier b, and only supports a packet switched handover. Therefore entry of the PLMN identifier b of the another core network indicates support for a packet switched handover.

When the terminal 218 establishes a voice session to the terminating terminal 258, the MME 214 determines, subsequent to initial steps 1, 2 in FIG. 3 of the accessing procedure, in a step 220 whether SRVCC is supported for a subscriber associated with the terminal 218 for the GWCN network configuration. Afterwards, in the step 3, authentication and authorization procedures are executed for the terminal 218. As the determination of the step 220 is in the affirmative, a support indication indicating support for voice session continuity for the subscriber associated with the terminal 218 is sent in a step 224 from the MME 214 to the eNodeB 212. The MME 214 sends in a step 226 a modified Handover Restriction List to the eNodeB 212 which comprises Selected PLMN identifiers a and equivalent PLMN identifiers a2 of those target core networks 210 indicating support for SRVCC and a packet switched handover of the terminal 218 from the source radio access network 204 to the target access network 262 associated with the packet switched domain of the target core network 210. The steps 224 and 226 are executed simultaneously and are part of a step 4 in that the support indication and the modified Handover Restriction List are included in an Initial Context Setup Request.

Next, in a step 228, the eNodeB 212 generates the Neighbor Cell List (NCL) based on the received PLMN identifiers a in the modified Handover Restriction List. The NCL comprises cells in the coverage area of which the terminal 218 may be located and which belong to a target radio access networks 204 indicated by the PLMN identifiers a received in the step 216. Hence, the NCL comprises the PLMN identifiers a indicating support for session voice continuity. In steps 230, 232 the eNodeB 212 requests measurements reports from the terminal 218 for the cells comprised in the NCL, and receives the request measurement reports. In a step 234, the eNodeB 212 determines for the target core networks 210 whose PLMN identifiers a associated with the cells comprised in the NCL whether a handover of the terminal 218 and SRVCC is in accordance with a local policy defined for the target core networks 210 indicated by the PLMN identifiers a received in the step 226. In a step 236, the eNodeB 212 determines whether any of the received PLMN identifiers a of the target core networks 210 is a preferred network identification, i.e. belongs to an operator of the source radio access network 204 and thus allows for a "preferred" handover. In a step 238, the eNodeB 212 selects the PLMN identifier a of the target core network 210 based on the measurement reports received in the step 232 and based on a result of the determinations in the steps 234, 236. Afterwards, conventional procedures regarding to the establishment of the session are executed in steps 5 to 12.

Instead of sending the Selected PLMN identifiers a and equivalent PLMN identifiers of those possible target core networks indicating support for SRVCC and for a packet switched handover in the modified Handover Restriction list, the Selected PLMN identifiers a, b and equivalent PLMN identifiers of all target core networks may be sent and the PLMN identifiers a supporting SRVCC may be indicated by an individual indication in the form of a tag. Further, the modified Handover Restriction List may comprise a list exclusively comprising the Selected PLMN identifiers b and equivalent PLMN identifiers of target core networks indicating no support for SRVCC but support for a packet switched handover and a separate list exclusively comprising the Selected PLMN identifiers a and equivalent PLMN identifiers a2 indicating support for SRVCC and the packet switched handover.

It is noted that the steps 220 to 238 may be executed during an established voice session of the terminal 218. This voice session may be initiated by the terminal 218 or by the terminal 258. It may also be that steps 220, 224 and 226 are executed when any data session is set up, and the steps 228 through 238 are executed later when an IMS-based voice session is added and SRVCC is triggered. In this way the information is provided to the eNodeB in advance when the UE gets connected to get data service and then it is used later only in case a voice session is actually set up.

In a step 476 illustrated in FIG. 4, the terminal 218 has an established voice session with the remote terminal 258 located in the home communication network 250. Based on measurement reports received in a step 478, the eNodeB 212 determines in a step 480 that a SRVCC handover has to be executed for the voice session of the terminal 218, since the terminal 218 gradually looses contact with the source radio access network 204. In a step 240, the eNodeB 212 sends a handover request to the MME 214, in order to inform the MME 214 that SRVCC has to be executed. Further, the handover request comprises the PLMN identifier a of the selected target core network 210. Further, in a step 242, the MME 214 selects the MSC-S 216 of the circuit switch domain of the target core network 210 based on the received PLMN identifier a. Further, the MME 214 determines in a step 244 that the MSC-S 216 is associated with at least another PLMN identifier b associated with the operator B, since the network configuration of the communication network 100 is of GWCN type. Accordingly, in a step 246, the MME 214 sends a handover required request comprising the PLMN identifier a of the target core network 210 to the MSC-S 216. In a step 248, the MSC 216 selects the target core network 210 based on the received PLMN identifier a. Afterwards, an inter domain handover between the MSC-S 216 and a target MSC-S 482 of the circuit switched domain of the target core network 210 is executed for a session transfer of the voice session of the terminal 218. The target MSC-S 482 serves the target radio access network 262.

It is noted that for ease of understanding, circles comprising one of the numbers 1 to 5 shown in FIGS. 3 and 4 are also shown in FIG. 2.

Figure 5:
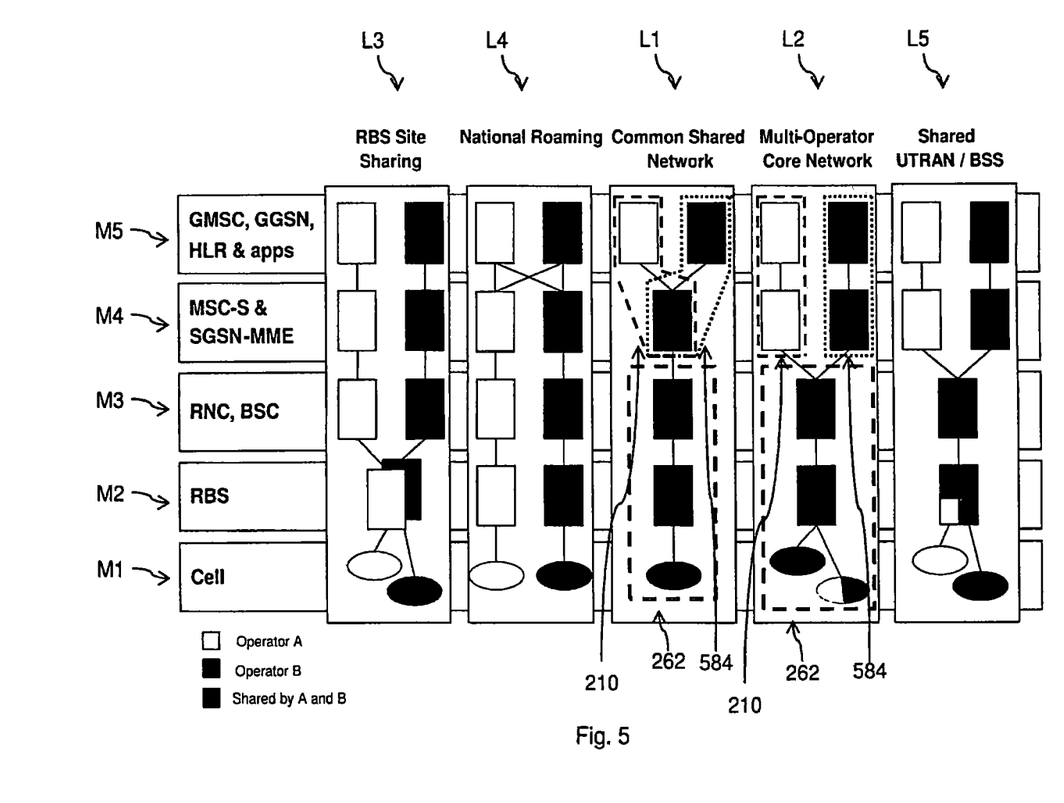
FIG. 5 is a block diagram illustrating network configurations of the communication network in FIG. 2.

Referring to FIG. 5, the GWCN network configuration L1 of the communication network 200 is explained. The another core network of the communication network 200 is denoted by a reference numeral 584. Alternatively, the communication network 200 may comprises a MOCN network configuration L2. For ease of understanding, a RBS Site Sharing network configuration L3, a National Roaming network configuration L4, and a Shared UTRAN/BSS network configuration L5 are illustrated. For each of the network configurations, network levels M1 to M5 are illustrated representing nodes located in these network levels M1 to M5. The levels M1 to M3 are associated with the target radio access network 262, and are associated with a cell, a Radio Base Station RBS, and a RNC or BSC, respectively. The network levels M4 and M5 of the target core networks 210 are associated with nodes such as the MSC-S, the SGSN, or the MME and a Gateway MSC (GMSC), a GPRS Support Node (GGSN), a Home Location Register (HLR) or applications, respectively.

In the GWCN network configuration L1, the network level M4 of the target core network 210 and the another target core network 584 and the target radio access network 262 are shared by the two different operators A and B. The core network 280 and the target radio access network 262 are associated with the PLMN identifiers a, and the another core network 584 and the target radio access network 262 are associated with the PLMN identifier b. Thus, the network level M4 of the target core network 210 and the another target core network 584 and the target radio access network 262 are associated with the different PLMN identifiers a, b for the different operators A and B. In the MOCN network configuration L2, each target core network 210, 584 is associated with one network operator A or B, and the target radio access network 262 associated with the target core networks 210, 584 is shared between the network operators A and B. Further, on the cell-level M1, a cell of the radio access network 262 can be exclusively associated with one target core network 210, 584 and thus one operator A or B, or can be shared by the target core networks 210, 584 and thus the operators A and B.

For example, in a first option of the MOCN network configuration L2 in which a MSC-S and a MME is present for each operator A and B, each core network 210, 584 may be associated with a dedicated LTE target radio access network for each of the operators A and B and with a shared UTRAN target radio access network 210. This MOCN network configuration L2 is also in accordance with older TS 23.251 versions earlier than Release 6 without multiple PLMN identifier lists but with a circuit switched and packet switched coordination in the communication network. In a second example of the MOCN network configuration L2, in which a MSC-S and a MME is present for each operator A and B, each target core network 210, 584 may be associated with a shared LTE target radio access network 210 and with a dedicated UTRAN target radio access network for each of the operators A and B. In a third example of the MOCN network configuration L2 in which a MSC-S and a MME is present for each operator A and B, each target core network 210, 584 is associated with a shared LTE/UTRAN target radio access network 210. This MOCN network configuration L2 is also in accordance with TS 23.251 versions earlier than Release 6 without multiple PLMN identifier lists but with a circuit switched and packet switched coordination in the communication network.

Figure 6:
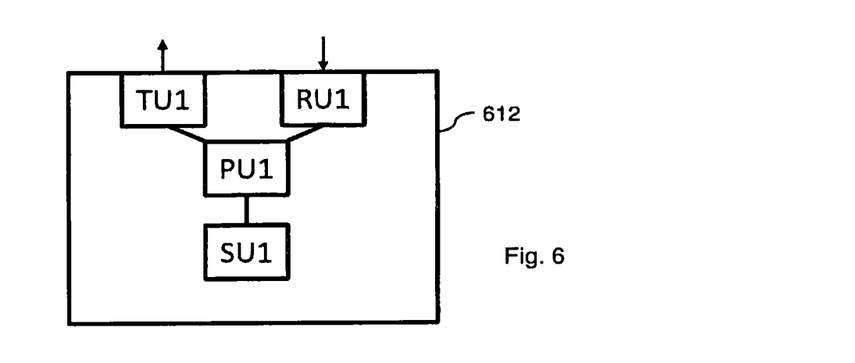
FIG. 6 is a block diagram illustrating a constitution of a node for selecting a target core network of a communication network for handing over a voice session of a terminal from a packet switched source radio access network of the communication network to a target radio access network of the communication network according to an exemplary embodiment of the invention.

Referring to FIG. 6, a node 612 for selecting a target core network of a communication network for handing over a voice session of a terminal from a packet switched source radio access network of the communication network to a target radio access network of the communication network is described. The voice session is anchored in an Internet Protocol Multimedia Subsystem of the communication network, and the selected target core network comprises a circuit switched domain which is associated with the target radio access network and supports voice session continuity allowing to hand over the voice session from the packet switched source radio access network to the target radio access network. The target radio access network is associated with a network identification of the target core network. The node 612 is part of the source radio access network. The node 612 comprises a reception unit RU1 configured to receive a network identification of at least one target core network associated with at least one target radio access network. The network identification indicates support for voice session continuity. The node 612 comprises a selection unit configured to select the target core network based on the indicated support of voice session continuity indicated by the received network identification. The selection unit forms part of a processing unit PU1 configured to process data or information related to a method of selecting a target core network of a communication network for handing over a voice session of a terminal from a packet switched source radio access network of the communication network to a target radio access network of the communication network as described above. The node 612 further comprises a sending unit TU1 configured to send data or information related to the above mentioned method, and a storage unit SU1 configured to store data or information related to the above mentioned method. The node 612 is configured as an eNodeB of a LTE source radio access network.

Figure 7:
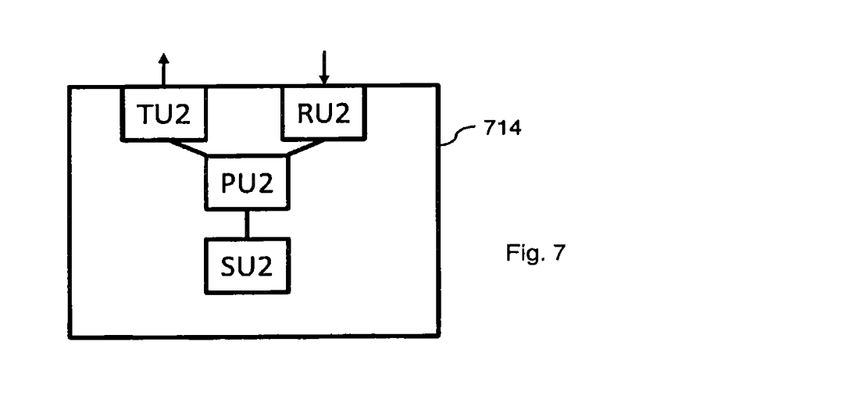
FIG. 7 is a block diagram illustrating a constitution of a control node for selecting a target core network of a communication network for handing over a voice session of a terminal from a packet switched source radio access network of the communication network to a target radio access network of the communication network according to an exemplary embodiment of the invention.

Referring to FIG. 7, a control node 714 for selecting a target core network of a communication network for handing over a voice session of a terminal from a packet switched source radio access network of the communication network to a target radio access network of the communication network is described. The voice session is anchored in an Internet Protocol Multimedia Subsystem of the communication network, and the selected target core network comprises a circuit switched domain which is associated with the target radio access network and supports voice session continuity allowing to hand over the voice session from the packet switched source radio access network to the target radio access network. The target radio access network is associated with a network identification of the target core network. The control node 714 is part of the communication network, and is associated with the source radio access network. The control node 714 comprises a sending unit TU2 configured to send a network identification of at least one target core network associated with at least one target radio access network, wherein the network identification indicates support for voice session continuity, for selecting the target core network based on the indicated support of voice session continuity indicated by the sent network identification. The control node 714 further comprises a reception unit RU2 configured to receive data or information related to a method of selecting a target core network of a communication network for handing over a voice session of a terminal from a packet switched source radio access network of the communication network to a target radio access network of the communication network as described above, a processing unit PU2 configured to process data or information related to the above mentioned method, and a storage unit SU2 configured to store data or information related to the above mentioned method. The control node 714 is configured as a MME of a packet switched domain of a source core network of the communication network.

It is noted that an association between the described functionalities of the nodes in FIGS. 6 and 7 and the functionality based units of these nodes may be different. For example, the selection unit of the node 612 may also form part of the sending unit TU1 of the node 612.

While the invention has been illustrated and described in detail in the drawings and foregoing description, such illustration and description are to be considered illustrative or exemplary and not restrictive; the invention is not limited to the disclosed embodiments, and in particular not to those embodiments in accordance with the cited 3GPP TSs. Other variations to the disclosed embodiments can be understood and effected by those skilled in the art in practicing the claimed invention, from a study of the drawings, the disclosure, and the appended claims. In the claims, the word "comprising" does not exclude other elements or steps, and the use of indefinite articles "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method in an eNodeB (eNB) for selecting a target Public Land Mobile Network (PLMN) of a communication network for a Single Radio Voice Call Continuity (SRVCC) handover to a target radio access network (RAN), wherein the target RAN supports SRVCC handover, the method comprising:
   receiving a Handover Restriction List from an Mobility Management Entity (MME), the Handover Restriction List comprising information indicating PLMNs preferred for SRVCC handover; and
   selecting the target PLMN based on the Handover Restriction List.

2. The method according to claim 1,
   wherein the target RAN is associated with a plurality of target PLMNs,
   wherein the PLMNs preferred for SRVCC handover comprise at least one of the plurality of target PLMNs, and
   wherein the selecting comprises selecting the target PLMN from the at least one of the plurality of target PLMNs.

3. The method according to claim 1, wherein the selecting comprises selecting the target PLMN based on a policy associated with the at least one of the plurality of target PLMNs.

4. The method according to claim 1, the method further comprising:
   requesting handover to the MME wherein the request indicates the target PLMN selected based on the Handover Restriction List.

5. A computer program product comprising a non-transitory computer readable medium on which a computer program is stored, the computer program comprising computer readable code, which, when being executed by a processor, causes the processor to perform operations comprising the method according to claim 1.

6. A method in a Mobility Management Entity (MME) for selecting a target Public Land Mobile Network (PLMN) of a communication network for a Single Radio Voice Call Continuity (SRVCC) handover to a target radio access network (RAN), wherein the target RAN supports SRVCC handover, the MME comprising:
   sending to an eNodeB (eNB) a Handover Restriction List comprising information indicating PLMNs preferred for SRVCC handover, for selection by the eNB of the target PLMN based on the Handover Restriction List.

7. The method according to claim 6, the method further comprising:
   determining whether SRVCC handover is supported for a subscriber associated with the SRVCC handover.

8. The method according to claim 6, the method further comprising:
   receiving a request for handover from the eNB, wherein the request indicates the selected target PLMN;
   selecting a MSC associated with the selected target PLMN; and
   sending a request for SRVCC handover to the MSC that was selected.

9. The method according to claim 8,
   wherein the request for SRVCC handover indicates the selected target PLMN.

10. An eNodeB (eNB) comprising a storage unit, the eNB configured for selecting a target Public Land Mobile Network (PLMN) of a communication network for a Single Radio Voice Call Continuity (SRVCC) handover to a target radio access network (RAN), wherein the target RAN supports SRVCC handover, the eNB further comprising:
- a reception circuit configured to receive a Handover Restriction List from an Mobility Management Entity (MME), the Handover Restriction List comprising information indicating PLMNs are preferred for SRVCC handover; and
- a selection circuit configured to select the target PLMN based on the Handover Restriction List.

11. A Mobility Management Entity (MME) comprising a storage unit, the MME configured for selecting a target Public Land Mobile Network (PLMN) of a communication network for a Single Radio Voice Call Continuity (SRVCC) handover to a target radio access network (RAN), wherein the target RAN supports SRVCC handover, the MME comprising:
- a sending circuit configured to send to an eNodeB (eNB) a Handover Restriction List comprising information indicating PLMNs preferred for SRVCC handover, for selection by the eNB of the target PLMN based on the Handover Restriction List.

* * * * *